Sheet 3-6 Sheets
Siemens & Halske,
Spirit Meter,
N° 69,714. Patented Oct. 8, 1867.
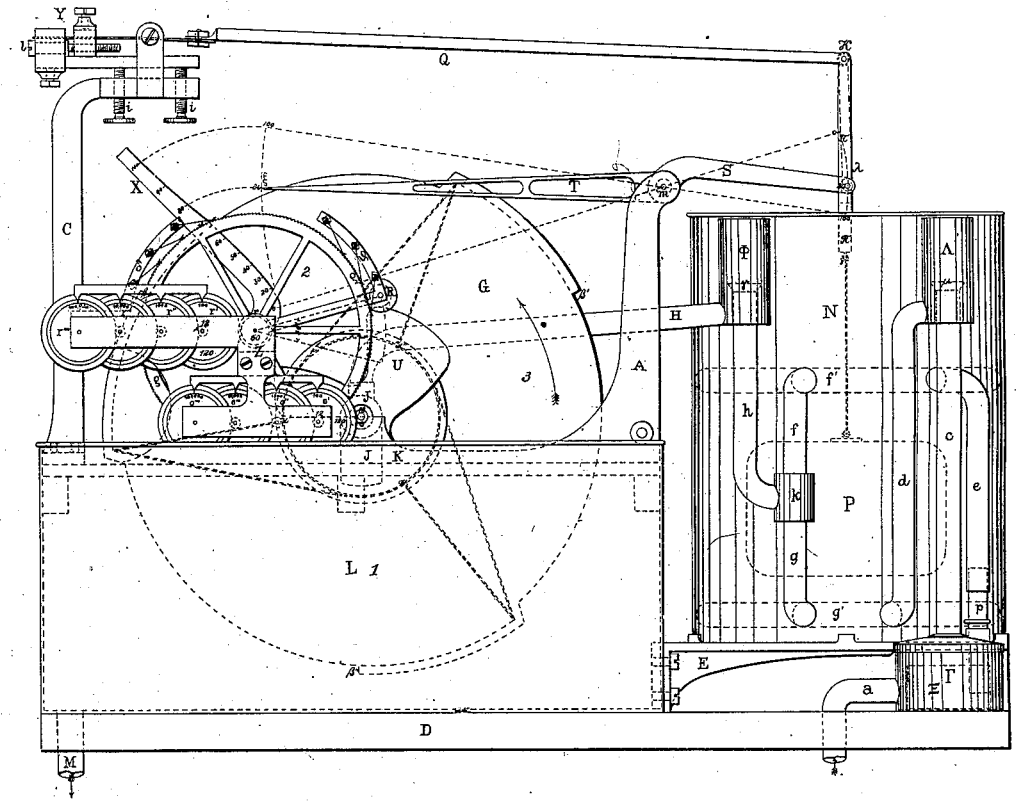
Witnesses:
Inventor:
W. Siemens and J. G. Halske
by their attorney
A. Pollok Sheet 4-6 Sheets.
Siemens & Halske,
Spirit Meter,
N°. 69,714. Patented Oct. 8, 1867.
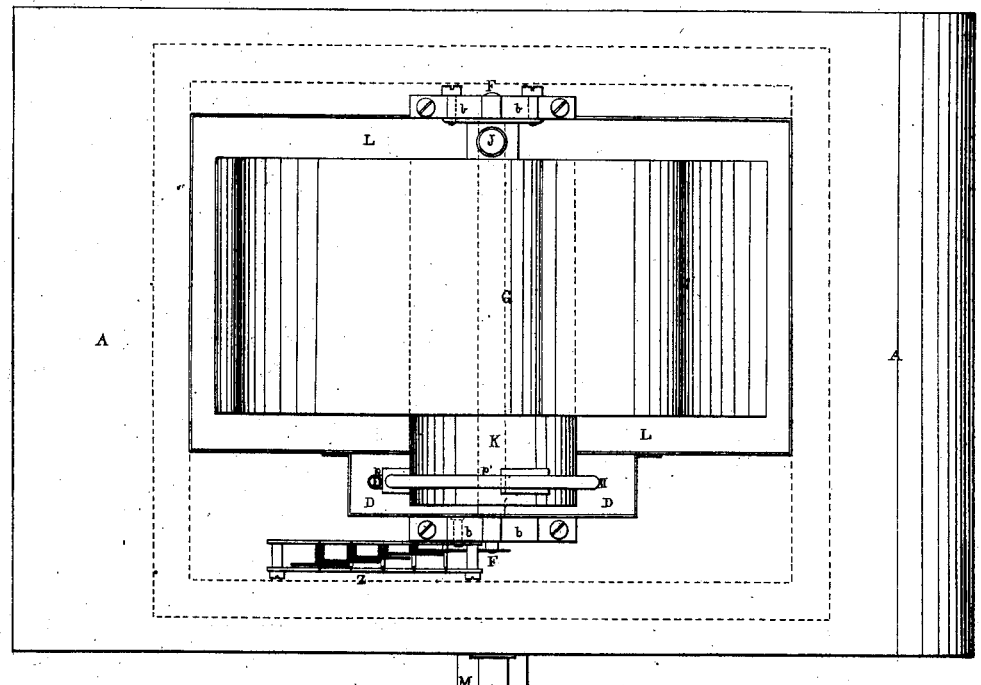
Witnesses:
Inventor:
M. Siemens and J. G. Halske
by their attorney
A. Pollok Sheet 5-6 Sheets.
Siemens & Halske,
Spirit Meter,
Nº 69,714.   Patented Oct. 8, 1867.
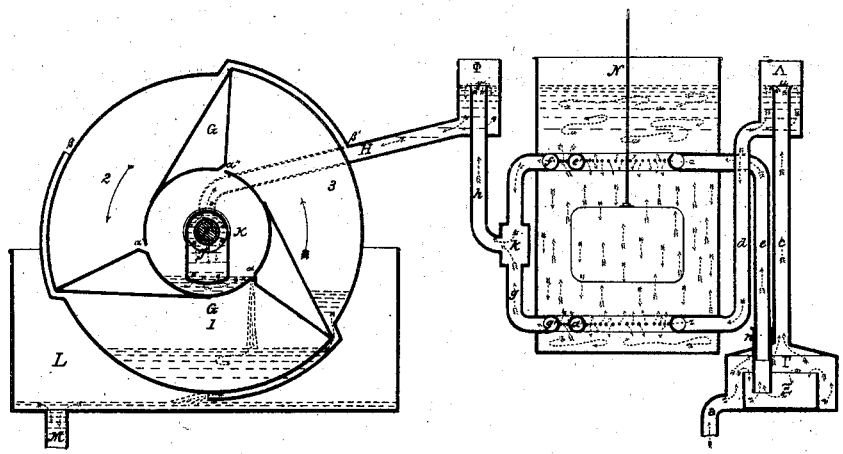
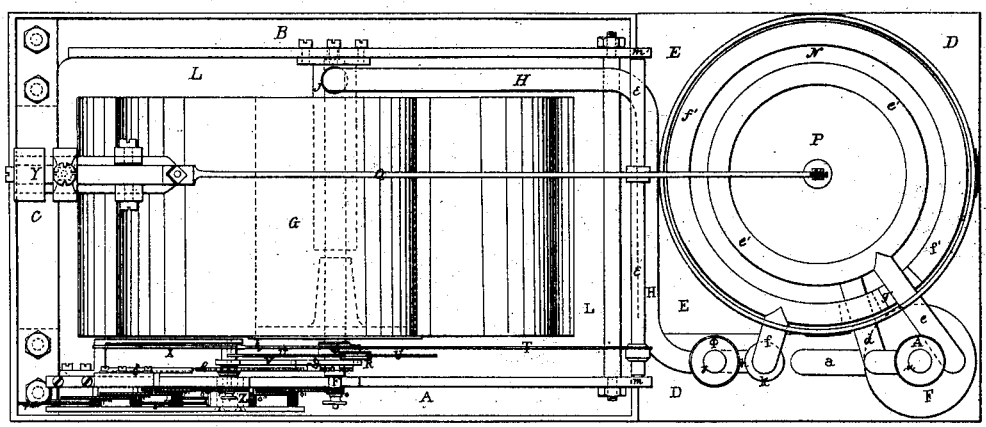
Witnesses:   Inventor:
   v. Siemens and J. G. Halske
   by their attorney
   A. Pollok

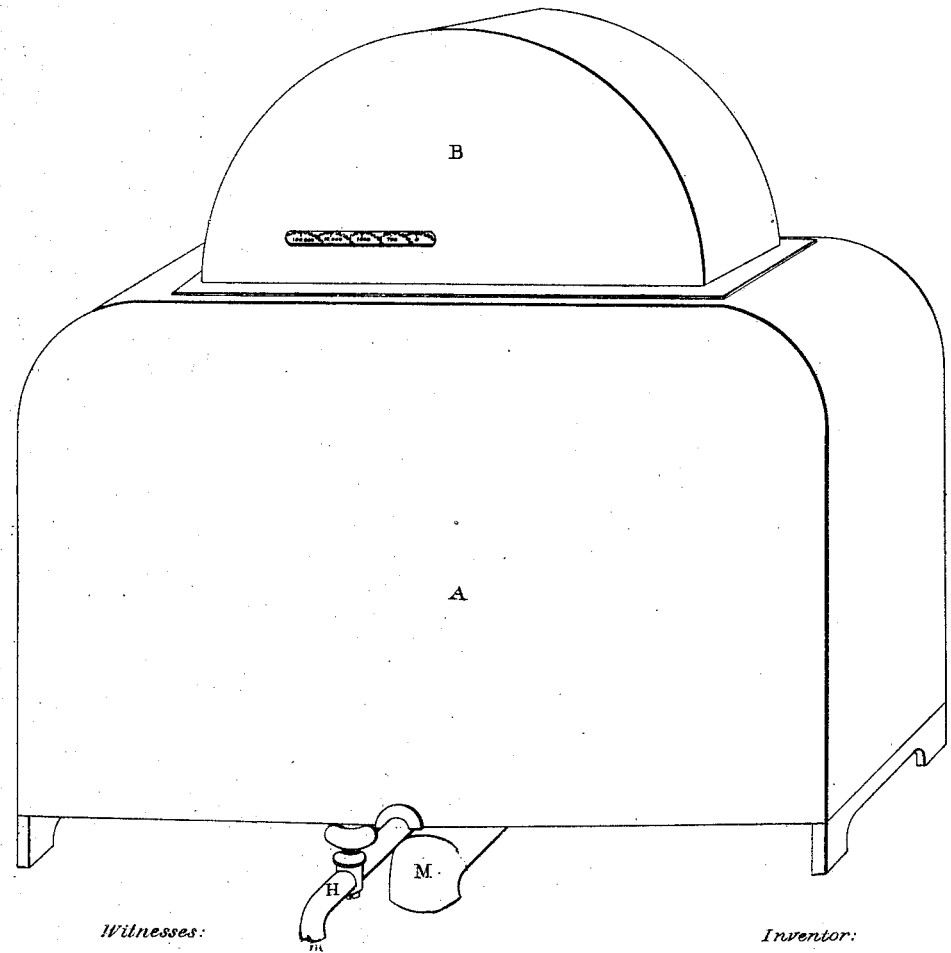

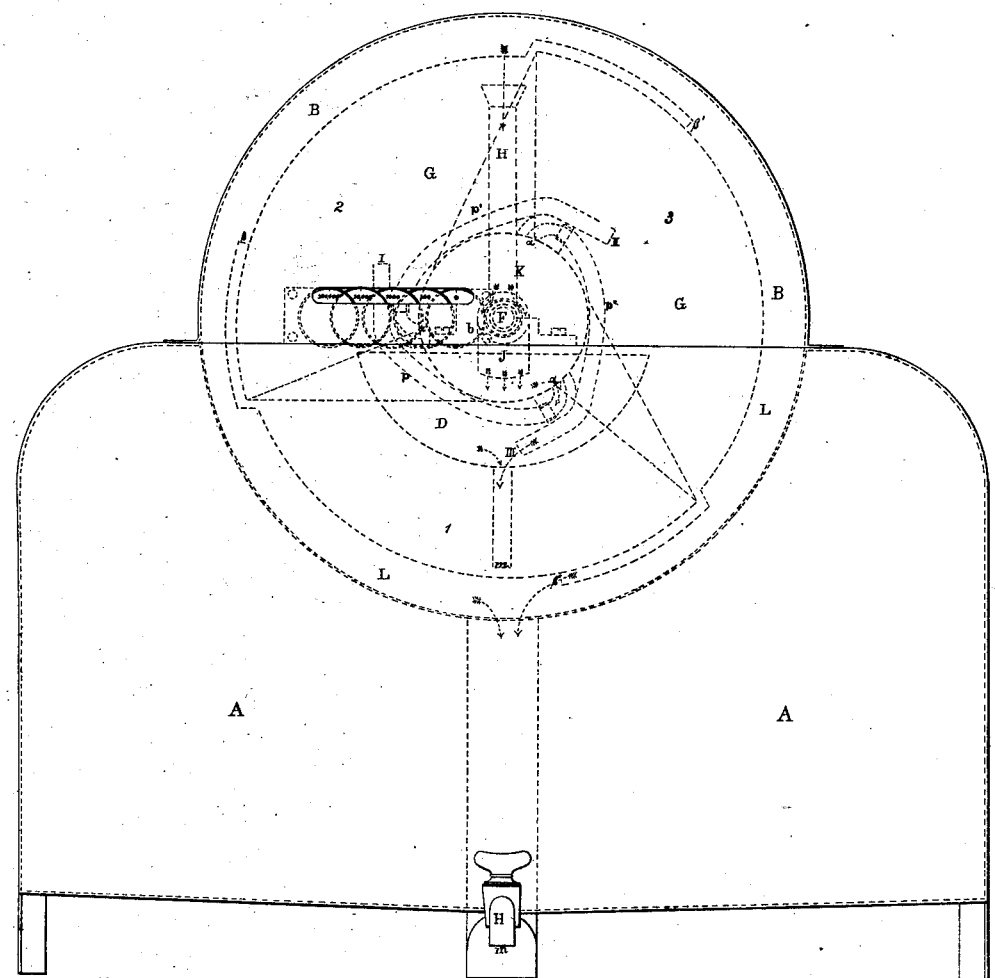

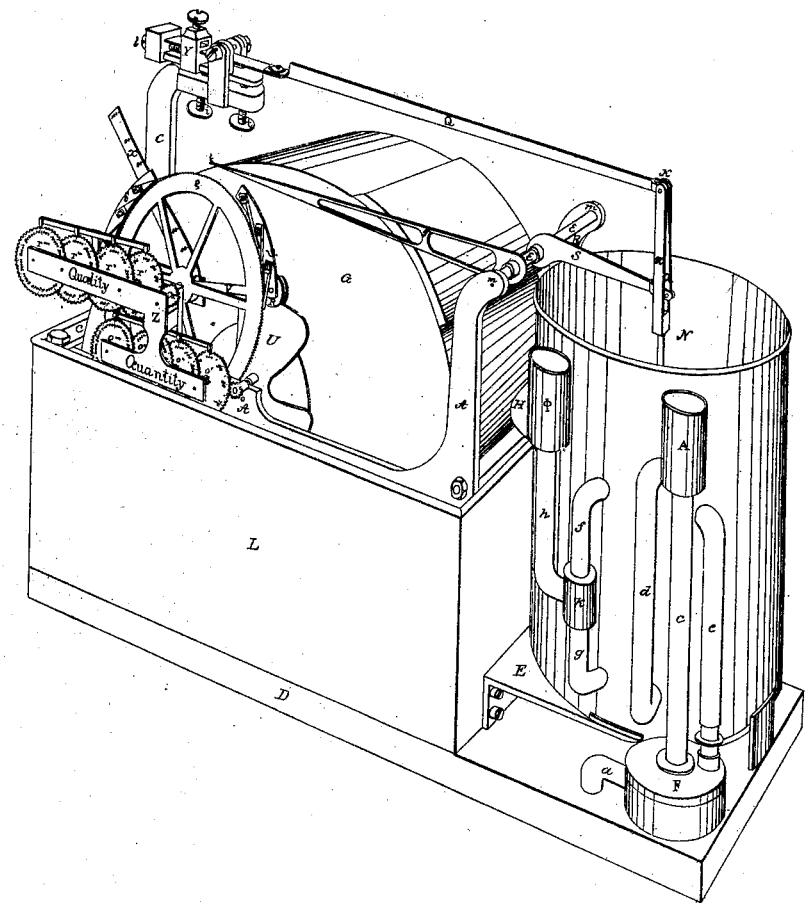

United States Patent Office.

WERNER SIEMENS AND JOHANN GEORG HALSKE, OF BERLIN, PRUSSIA.

*Letters Patent No. 69,714, dated October 8, 1867.*

---

IMPROVEMENT IN SPIRIT-METERS.

---

*The Schedule referred to in these Letters Patent and making part of the same.*

---

TO ALL WHOM IT MAY CONCERN:

Be it known that we, WERNER SIEMENS and JOHANN GEORG HALSKE, of Berlin, in the Kingdom of Prussia, have invented certain new and useful Improvements in Spirit-Meters; and we do hereby declare that the following is a full, clear, and exact description of the same, reference being had to the annexed sheets of drawings, making a part of the same.

The purpose of our apparatus is to measure the volume of pure alcohol which flows through it, independent of the volume of spirit in which the same is contained, and, at the same time, to measure the volume of the spirit itself. To this end, although the counterwork for the pure alcohol is set in motion each time that a certain measured quantity of spirit passes through, it is, nevertheless, only advanced by so much as corresponds exactly with the volume of pure alcohol contained in it. This corresponding indication is attained by means of a curve turning upon the axis of the first wheel of the counterwork, which strikes against an index moved up and down by means of an alcoholometer, so that the indications of the alcoholometer and its index prescribe the limits of the angles through which the curve, and therefore the counterwork, of the apparatus can turn.

The principal parts of the apparatus are as follows:
1. The drum G.
2. The vessel N, in which the alcoholometer P hangs.
3. The spring system Y Q, with lever S and index T.
4. The influx arrangement $a\ e\ d\ e$ and efflux system $f\ g\ h\ k$.
5. The trefoil U.
6. The angular lever V, with the curve X, ratchet-wheel $s$, and click-springs.
7. The counterwork for pure alcohol $r\ r'\ r''\ r'''\ r''''$; and
8. The counterwork for spirit $o\ o'\ o''\ o'''\ o''''$.

1. The measuring-drum G is made of galvanized sheet copper. It is divided into three compartments, I, II, and III, each of which, at a temperature of 60° Fahrenheit, contains one gallon, so that the whole drum contains exactly three gallons. The spirit, which flows into the drum through the central cylinder K, enters the measuring-compartments through the slits $a\ a'\ a''$, and leaves them through the flat tubes $b\ b'\ b''$. The measuring-drum turns upon the axis J, in bearings in the two side pieces of the frame A B C. The latter is supported in the rectangular copper trough L, which stands upon the sole-plate D, and whose purpose is to receive the spirit as it leaves the compartments of the measuring-drum. The spirit flows into the measuring-drum through the tube H, reaches the inner cylinder K by means of the annular chamber I, the under side of which is pierced with numerous holes to allow the spirit to flow regularly into the central cylinder, and which is so supported that the drum turns around it and the axis within it without friction. The centre of gravity of the drum, when empty, lies in the axis. The compartments, however, are so constructed, that, upon the influx o spirit into a compartment, the centre of gravity of the whole system lies under the axis, and tends to move it slightly towards the left hand, by reason of which the drum turns sufficiently to lift the influx-slit, through which the spirit at the moment flows, above, and simultaneously to depress that of the next following compartment below, the surface. The flow into the first compartment ceases therefore, and that into the second begins. By this means the centre of gravity of the drum is moved further towards the left, by reason of which the drum makes quickly one third of a revolution, pouring out the spirit from the first compartment into the trough L, and bringing the centre of gravity again under the axis.

2. On the bracket E is the cylindrical mixing-vessel N, which receives, through a system of supply tubes, $a\ c\ d\ e\ d'\ e'$, the spirit which is to be measured before it passes through the tube H into the measuring-drum. The alcoholometer P hangs in the middle of this vessel. It is constructed of thin sheet brass, in the form of two flattened spheroids, one on the other, and is filled with strong alcohol and hermetically sealed. Its purpose is, first, to guide the index T, and, secondly, by its greater coefficient of expansion, to compensate the effects of variations in temperature. The form of this alcoholometer float is such as to allow of a considerable expansion and contraction, according as its temperature rises or falls.

3. The alcoholometer swimmer is supported in the mixing-vessel partly by the spirit which flows through the apparatus, and partly by the spring system Y Q, the deflections of which are communicated by the intervening coupling π λ with the arm S, which is fixed upon the same axis as the index arm T. Thus the indications of the alcoholometer are brought up to the curve U, which strikes against the index. The spring system consists of three parts: the inflexible arm Q, which is connected with the flat spring $y$ and the screws Y, for adjusting the height as well as the length of the spring.

4. The mixing arrangement $a\ c\ d\ e$ is employed in order to counteract the tendency of the spirit to separate into strata in the vessel N. In its construction advantage is taken of the difference between the specific gravity of the various strengths of alcohol which leave the condenser, to conduct the heavier or weaker spirit into the mixing vessel above, and the lighter or stronger spirit underneath the alcohol swimmer. When weaker spirit than the mean of that in the mixing-vessel reaches the chamber Γ of the condenser through the tube $a$, the same will, by reason of its greater specific gravity, fall into the inner concentric compartment z, and rise, through the tube $e$, into the ring $e'$, which is, on its inner side, pierced with holes. The sections of these holes increase in size the further they are from the junction of the ring with the tube $e$. The purpose of this is that the influx of the spirit may take place equally around the whole mixing-cylinder. If, on the contrary, stronger spirit than the mean of that in N reaches the vessel Γ, it rises, by reason of its smaller specific gravity, through the tube $c$ to the mouth $\mu$, falls into the funnel A, and flows from this through the tube $d$ into the ring $d'$, which is constructed similarly to $e'$. The two arms $f\ g$ of the efflux arrangement $f'\ g'\ f\ g\ h\ k$ are intended to insure spirit of mean strength reaching the measuring-drum. $f'$ and $g'$ are rings constructed in the same way as $d'$ and $e'$. The spirit passes from them, through the tubes $f$ and $g$, into the central space $k$, from which the mixture of heavier and lighter spirit flows through the tube $h$, funnel Φ, tube II, and annular chamber J into the inner cylinder K of the measuring-drum.

5. The metal trefoil U is fixed upon the axis of the measuring-drum and turns with it. Its form is that of a circular disk, cut out at three points into deep hollows at distances of one hundred and twenty degrees from each other. It is placed upon the axis, so that during the time one of the compartments is being filled, one of the leaves of the trefoil stands upwards and holds back the curve. On the left-hand side of this arrangement is—

6. The angular lever system V, whose axis, in the arm Z, is, at the same time, axis of the first wheel of the counterwork. The lever V has, at its further end, a jockey-wheel, R, which is lifted upon the periphery and falls into the hollows of the trefoil U. Two systems of click-springs, upon $\vartheta$ and $\Theta$, engaging with the teeth of the ratchet-wheel $\tau$, cause the latter to remain stationary when the jockey-wheel falls into a hollow of the trefoil, and to turn correspondingly with the curve when it is lifted again upon the periphery. The divisions of the curve are so arranged that, first, when pure alcohol passes through the apparatus, the index T takes such a position as to allow the curve and counterwork to turn through an angle of thirty-six degrees; the index has, in this case, its highest position, and points to 100 on the curve; second, when water at 60° Fahrenheit flows through, the index touches the curve at 0, and prevents the jockey-wheel from falling into the hollows of the trefoil, and, therefore, the counterwork from turning; third, when spirit of $n$ volumes per cent. passes through the apparatus, the curve strikes the index in that point which allows the angular lever, ratchet-wheel, and counterwork to turn through $36\frac{n}{100}°$.

7. The rotation of the first wheel $\vartheta$ of the counterwork is communicated to the remaining wheels $r', r'', r'''$, and $r''''$, in the usual way, by means of intervening pinions. The apparatus is therefore able to measure the volume of pure alcohol which passes through it, whatever the strength of the spirit may be in which it is contained.

8. The lower counterwork $o\ o'\ o''\ o'''\ o''''$ measures, on the other hand, the entire volume of the spirit. The first wheel $o$ of this system is therefore attached directly to the axis of the measuring-drum. Each of the counterworks is graduated from one to ten thousand gallons.

By reason of the peculiar tripartite formation of the measuring-drum, its measurements are independent of the velocity of the spirit or fluid which enters it, which is not the case with any of the spirit-meters heretofore made; and, moreover, the drum by this means is enabled, during its rotation, to exert sufficient force to set the curve and counterworks in motion without the measurements losing anything in exactness.

This tripartite measuring-drum, with its springing motion, is especially adapted to indicate the quality of the spirit passing through the meter, by drawing off a sample of the same in such manner that while the volume of fluid is being measured, a quantity completely proportional to such volume is furnished for testing purposes.

The principal parts of this simplified apparatus are (as shown in Sheet V)—

1. The measuring-drum G, above the trough L.
2. The test-tubes $p\ p'\ p''$, with the aperture D, at the side of trough L.
3. The vessel A for receiving the sample.
4. The indicator for the volume of the liquid.

1. The drum G is, in a working apparatus, made of tinned copper sheathings. The internal arrangement and functions of the different parts of the drum are entirely similar to those of the drum hereinbefore described, and the compartments so far correspond in size, that, while in the first-mentioned apparatus they are each adapted to contain one gallon, here they contain 0.1 gallon. The cylinder K, however, differs in construction from that previously described. In the apparatus now under consideration it projects 1.1 inch to the front for the purpose of enabling the test or sample to be withdrawn from it, and the spirit conveyed or passing from the cooler enters it immediately. The fluid runs through the trough L and is discharged at M.

2. Upon the periphery of that portion of the cylinder K which projects from the drum there are three tubes, $p\ p'\ p''$, of suitable calibre, and of equal diameter, (0.1 inch,) with corresponding or similar curves, and having the same or corresponding positions with respect to the periphery of the cylinder. Their inner ends are attached to the cylinder, so as to correspond, respectively, in position to the apertures $a\ a'\ a''$, through which the spirit, as above explained, passes to the compartments of the drum G, and their outer ends have the same relative position with respect to the points where they are attached to the cylinder, as the openings $\beta$ $\beta'$ $\beta''$ hold to the openings $\alpha$ $\alpha'$ $\alpha''$. It is obvious, therefore, that the tubes are filled in the same proportion as the drum, a small sample or test quantity of the spirit being thus obtained, which is proportionate to the volume of the same which is being measured. The pocket or smaller trough D, attached to the side of the trough L, receives the sample, and conducts it through the tube $m$ into—

3. The trough or vessel A, which serves, at the same time, as a base or support for the apparatus.

4. The rotation of the first wheel of the indicator is produced, as shown in the drawing, by direct communication with the axis of the drum, so that the volume of spirit which passes during one rotation of the drum will be clearly marked by the indicator.

Having now described our invention, and the manner in which the same is or may be carried into effect, what we claim, and desire to secure by Letters Patent, is—

1. The measuring-drum, constructed and arranged as herein described, so as to rotate with a springing motion, that is to say, provided with three compartments so formed that the centre of gravity of the spirit during its influx into said compartments shall lie in a vertical plane, passing through the axis of the drum, substantially as shown and set forth.

2. The alcoholometer, in combination with its index and supporting spring, substantially as and for the purposes herein shown and specified.

3. The mechanism herein described for imparting to the counterwork a motion which shall at all times be proportionate to the volume of pure alcohol contained in the spirit or liquid which passes through the measuring apparatus.

4. The combination, with the mixing-vessel N, of the pipes or tubes for the induction of the spirit or liquid, arranged as described, so that when spirit of varying strength is conducted into said vessel, the heavier shall enter above and the lighter below the alcoholometer, substantially as and for the purposes set forth.

5. The combination, with the measuring-drum and interior cylinder K, of the mechanism for obtaining a sample of the spirit proportionate in quantity to the volume of the said spirit which is measured, arranged and operating substantially as set forth.

In testimony whereof we have signed our names to this specification before two subscribing witnesses.

WERNER SIEMENS,
JOHANN GEORG HALSKE.

Witnesses:
H. KREISMANN,
T. H. PRILLWITZ.